Feb. 5, 1946.  R. R. HARRISON  2,394,240
GANG CLAMP
Filed Dec. 20, 1941  2 Sheets-Sheet 1

INVENTOR.
ROBERT R. HARRISON
BY
ATTORNEY

Feb. 5, 1946.          R. R. HARRISON          2,394,240
GANG CLAMP
Filed Dec. 20, 1941          2 Sheets-Sheet 2

INVENTOR.
ROBERT R. HARRISON
BY H. W. Brelsford
ATTORNEY

Patented Feb. 5, 1946

2,394,240

UNITED STATES PATENT OFFICE 2,394,240

GANG CLAMP

Robert R. Harrison, North Hollywood, Calif., assignor, by mesne assignments, to Bendix Aviation Corporation, South Bend, Ind., a corporation of Delaware Application December 20, 1941, Serial No. 423,843

1 Claim. (Cl. 248—68)

This invention relates to tube clamps and more particularly to a gang clamp for holding a plurality of tubes.

It is an object of the invention to provide the strongest possible gang clamp with the smallest amount of material and weight.

Another object of the invention is to provide a light weight gang clamp in which cushions are provided for cushioning conduits against the metal structure of the gang clamp.

Still another object is to provide a gang clamp having cushions therein and having conductor strips overlying the cushions to remove static charges from any tube or conduit held by the clamp.

Another object is to provide a gang clamp having cushions of rubber-like material which cushions are vulcanized or bonded to the metal structure of the clamp.

Another object is to provide an inexpensive clamp which may be rapidly manufactured.

In the drawings forming a part of this specification:

Figure 1:
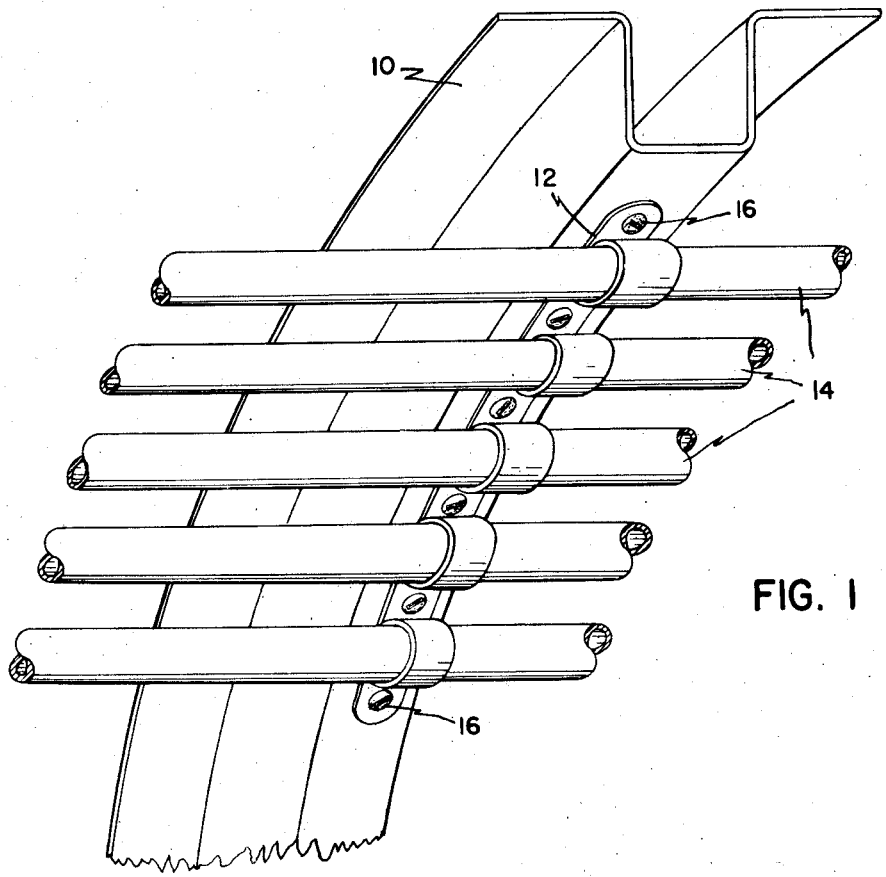
Figure 1 is an isometric view of a structural member of an airplane to which is secured a gang clamp made according to the invention and holding a plurality of conduits.

Referring to Figure 1, a U shaped airplane structural member 10 has secured thereto a gang clamp 12 holding a plurality of conduits 14. The gang clamp may be secured to the member 10 by screws 16 held by threads formed in the member 10, or by nuts of any suitable type placed within the channel of structural member 10. It will be noted that the gang clamp holds a large number of conduits against the structural member of the airplane in which position they interfere the least amount with the use of area inside of an airplane. The conduits 14 may be of any type such as hydraulic, air, or electrical conduits.

Figure 2:
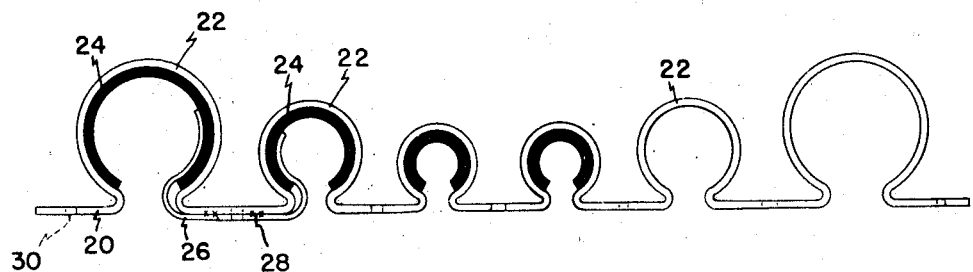
Figure 2 is an elevation view of a representative gang clamp made according to the invention.

A representative gang clamp is shown in Figure 2. There it will be noted that a single strip of metal 20 has formed therein a series of loops 22 in the shape of a fairly complete circle. Some of the loops 22 have secured to the inside thereof a cushion 24 which is preferably made of a rubber-like material such as neoprene or other synthetic, oil resisting, rubber-like materials. The cushions 24 are very useful in cushioning any conduit held in the gang clamp from contact with the metal 20 of the gang clamp. This is important in airplanes, where there is intense vibration at times which would cause injury to fragile conduits held by bare metal clamps alone. The cushions 24 are best secured to the metal strip 20 by bonding or vulcanizing, as completely described in copending application Serial Number 387,210, filed April 7, 1941. In order to prevent the accumulation of static charges on conduits held in cushions 24, conductor strips 26 are provided which overlie a portion of the cushion 24 in order to contact any conduit held therein. Conductor strips 26 are made of a very soft material so as not to injure the conduits, and are secured to the metal strip 20 by any suitable process such as welding indicated at 28. The strips 26 may or may not be vulcanized to the inside of the cushion 24, and may or may not be formed with a roughened surface to break through any surface coating on conduits placed in the clamp. The clamp may be secured to any structure by passing screws or bolts through holes 30 in metal strip 20.

To use the gang clamp of Figure 2, each loop 22 is opened up by spreading the mouth of the loop until it is large enough to insert a conduit therein. The metal strip 20 is preferably made of a light weight material such as aluminum which has been heat treated to give it great resiliency so that this spreading action may take place within the elastic limit of the strip 20. After the conduit has been inserted in the loop 22, the loop is allowed to close, and the conduit is almost completely encircled by the cushion 24, or in the loops where there is no cushion, by the metal loop 22. Each loop in turn is thus spread to insert a tube therein, and when the desired number have been inserted in the gang clamp the gang clamp as a whole may be attached to any desired structure as shown in Figure 1.

When it is desired to remove a conduit from the gang clamp the loops 22 are merely spread a sufficient amount to allow removal of the conduit through the mouth of the loop. If the conduit desired to be removed is one of the end loops 22 the last or outside screw in hole 30 may be removed allowing the spreading of that loop alone. If the conduit desired to be removed is one of the center loops, one-half of the gang clamp may be unscrewed from its support, and the desired loop may be spread by bending the entire half of the clamp upwardly. This may be done without removing the neighboring conduits as there is usually sufficient resiliency in the conduits to allow their flexing over a distance to spread any center loop.

Figure 3:
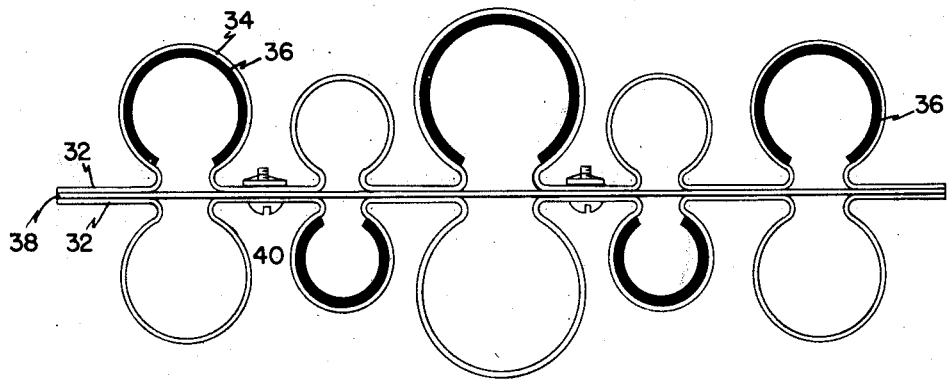
Figure 3 is an elevation view of a pair of gang clamps secured to a stiffening strip, illustrating the compactness of an area within which conduits may be held by gang clamps made according to the invention.

A gang clamp arrangement shown in Figure 3 is designed to accommodate a large number of conduits within a limited cross-sectional area. If it is not desired to place two gang clamps end to end along a member of an airplane, the same number of conduits may be accommodated by placing the gang clamps back to back as shown in Figure 3. In such arrangements the gang clamps will probably be held at the ends only and it is therefore desirable to apply a stiffening strip between them to which the gang clamps may be secured.

In Figure 3, two similar metal strips 32 have loops 34 formed therein, some of which may be cushioned as indicated at 36. The two gang clamps thus formed may be placed on either side of a stiffening strip 38 to give them rigidity and both may be fastened to strip 38 at spaced points by any desired means such as nut and screw means 40. The ends of the gang clamp assembly shown in Figure 3 may be secured to any desired member in any suitable manner.

Figure 4:
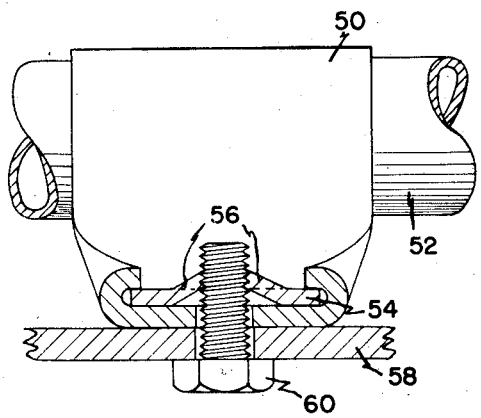
Figure 4 is a cross-sectional view of a part of a gang clamp and support, showing one manner of attaching a gang clamp to its support.

One desirable means of fastening a gang clamp to a support or to a stiffening member is shown in Figure 4. A loop 50 of a gang clamp surrounds a conduit 52 and holds the same. A part of the metal from which the loop 50 is formed has its edges crimped inwardly to secure a nut 54 therein. This nut may be of a type available to the trade wherein two or more fingers 56 are raised from a small rectangular piece of sheet metal. The clamp is held to a support 58 by a bolt 60 which passes through a hole in the support and in the metal of the clamp, to thread into the nut 54. This arrangement shown in Figure 4 constitutes an easy and speedy assembly of a nut element to a gang clamp, and therefore represents an improvement in the gang clamp.

Figure 5:
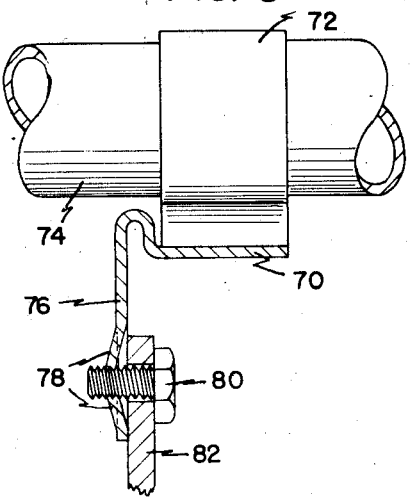
Figure 5 is a view in cross section of a gang clamp and a support at right angles to the conduits held by the clamp, showing another manner of attaching a gang clamp to a support.

In Figure 5 a strip of metal 70 has formed therein a loop 72 which holds a conduit 74. Formed as an ear on strip 70 is a metal piece 76 bent at right angles to the strip 70, and having formed therein a nut of the type shown in Figure 4 wherein two fingers 78 are raised from the material of the metal piece 76. A bolt 80 passes through a hole in a support member 82 and into the nut, and secures the metal piece 76 to the support thus supporting the gang clamp as a whole. When a nut of the type described is formed in the metal of a gang clamp or other clamp, the metal is preferably of a harder type such as steel since aluminum and the lighter airplane metals are too soft for high quality nuts.

Figure 6:
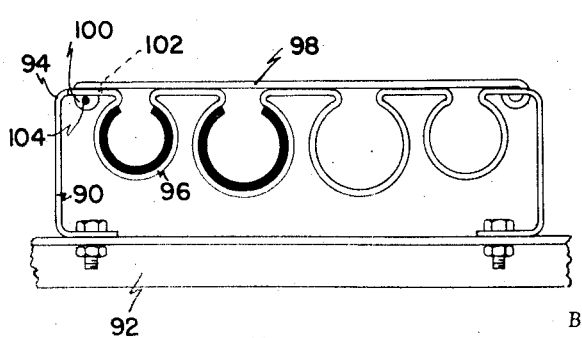
Figure 6 is an elevation view of a modified form of the invention showing loops having openings directed outwardly.

Shown in Figure 6 is a modified form of the invention, showing a gang clamp 90 secured to a support 92. A strip of metal 94 has loops 96 formed therein having the openings thereof directed outwardly with respect to the support 92 to which the clamp is fastened. The loops 96 may or may not be cushioned, and the cushioned loops may or may not be electrically bonded to the strip 94. A closure strip 98 is provided to close the openings of the loops 96, and is secured to the strip 94 by hooks 100 formed in the ends and inserted in slots 102, pins 104 passing through the hooks to secure them.

The operation of the clamp of Figure 6 is as follows. The strip 98 is removed by removing one of the pins 104 from its hook 100, and rotating the strip 98 about its other end. Loops 96 are now available for inserting a conduit therein, and this may be done by manually pulling the clamp as a whole outwardly in its central portion until the desired loop is stretched enough to permit the insertion of a conduit. The clamp as a whole is then allowed to assume its original position and the strip 98 is rotated into place and secured by inserting the pin 104. Conduits are removed in a similar manner merely by pulling the clamp as a whole outwardly until the desired loop 96 is spread sufficiently to allow the removal of the conduit.

The advantage of the clamp of Figure 6 resides in its accessibility. In the type of clamps previously described it is necessary to remove a part or the whole of the clamp from the support to which it is secured to remove a conduit. In the clamp of Figure 6 this is unnecessary. The clamp may be permanently fastened to its support and conduits may be removed or inserted without affecting this attachment in any way whatsoever.

Although this invention has been described with reference to particular embodiments thereof, it is not limited to these embodiments nor otherwise except by terms of the following claim.

I claim:

A gang clamp comprising a metal strip having formed therein a looped section consisting of a plurality of loops having openings all facing toward one side each loop being cylindrically curved and of arcuate extent substantially exceeding 130° and having an opening of arcuate extent substantially less than 180° whereby a cylindrical element of the same radius of curvature as a loop is insertable and removable through the opening of the loop only by spreading the loop to enlarge the opening thereof, and the outer end sections of the strip beyond the looped section being extended at an angle away from said one side, the outer ends of said end sections being spaced substantially from said looped section and being adapted to be secured to a support whereby the section of said strip intermediate said end sections is free to extend to permit enlargement of said loop openings for the insertion into the loops of elements to be supported thereby, a detachable, non-extensible retainer strip adapted to overlie said looped section and said loop openings, and means for securing the ends of said retainer strip to opposite ends of the looped section of said strip to prevent extension thereof.

ROBERT R. HARRISON.